United States Patent [19]
Doering

[11] Patent Number: 5,202,403
[45] Date of Patent: Apr. 13, 1993

[54] LIGNIN MODIFIED PHENOL-FORMALDEHYDE RESINS

[75] Inventor: Glen A. Doering, Gig Harbor, Wash.

[73] Assignee: Georgia-Pacific Resins, Inc., Atlanta, Ga.

[21] Appl. No.: 821,939

[22] Filed: Jan. 15, 1992

[51] Int. Cl.$^5$ .................. C08H 5/02; C08G 63/48; C08G 63/91
[52] U.S. Cl. .................. 527/403; 525/54.42; 528/155; 530/501; 530/502
[58] Field of Search .................. 527/403; 525/54.42, 525/54.45; 528/155; 530/501, 502

[56] References Cited

U.S. PATENT DOCUMENTS

| | | | |
|---|---|---|---|
| Re. 32,408 | 4/1987 | Janiga | 527/403 |
| 2,786,008 | 3/1957 | Herschler | 154/132 |
| 2,828,297 | 3/1958 | Glesen | 524/799 |
| 3,017,303 | 1/1962 | Ayers | 154/45.9 |
| 3,076,772 | 2/1963 | Christ | 523/129 |
| 3,095,392 | 6/1963 | Herrick | 530/500 |
| 3,185,654 | 5/1965 | Ball et al. | 527/403 |
| 3,200,070 | 8/1966 | Herrick | 252/8.5 |
| 3,454,508 | 7/1969 | Herrick et al. | 527/403 |
| 3,658,638 | 4/1972 | Ludwig et al. | 428/529 |
| 3,825,526 | 7/1974 | Forss et al. | 524/799 |
| 3,864,291 | 2/1975 | Enkvist | 524/799 |
| 3,912,706 | 10/1975 | Rachor et al. | 527/403 |
| 3,931,072 | 1/1976 | Coyle | 527/403 |
| 4,017,475 | 4/1977 | Ludwig | 527/403 |
| 4,105,606 | 8/1978 | Forss et al. | 524/73 |
| 4,303,562 | 12/1981 | Hollis, Jr. et al. | 524/735 |
| 4,306,999 | 12/1981 | Adams et al. | 524/735 |
| 4,423,173 | 12/1983 | Janiga | 524/14 |
| 4,514,532 | 4/1985 | Hsu et al. | 524/14 |
| 4,537,941 | 8/1985 | Kambanis et al. | 527/403 |
| 4,584,057 | 4/1986 | Rowe et al. | 162/16 |
| 4,701,383 | 10/1987 | Janiga | 428/527 |
| 4,769,434 | 9/1988 | Van der Klashorst et al. | 527/403 |
| 4,828,643 | 5/1989 | Newman et al. | 156/328 |

FOREIGN PATENT DOCUMENTS 1601751 11/1981 United Kingdom .

OTHER PUBLICATIONS

Nimz, "Lignin-Based Wood Adhesives", pp. 270-277 (undated).
Chem Abstr., CA111(1):2677k, Struszczyk et al., Jul. 31, 1987.
Chem. Abstr., CA109(12):94178h, Karam et al., Mar. 22, 1988.
Chem. Abstr., CA108(26):223339s, Sestauber et al., Jun. 15, 1987.
Chem. Abstr., CA106(6):33983h, Eek Vancells, Jan. 1, 1986.
Chem. Abstr., CA105(26):227864v, Doronin et al., Jan. 30, 1986.
Chem. Abstr., CA110(18):156375b, Sukhaya et al., Aug. 15, 1988.
Chem. Abstr., CA109(8):55873m, Markessini et al., Dec. 9, 1987.
Chem. Abstr., CA103(12):89255c, Noll et al., Mar. 6, 1985.

(List continued on next page.)

Primary Examiner—Nathan M. Nutter
Attorney, Agent, or Firm—Banner, Birch, McKie, & Beckett

[57] ABSTRACT

A modified resole resin and an adhesive composition containing the resin wherein the resin is prepared by first reacting formaldehyde and a phenol at a mole ratio of formaldehyde to phenol of less than about 1.0 in the presence of alkaline in an amount sufficient to provide a mole ratio of said alkaline material to phenol between about 0.04 and 0.08 to form a precursor resin; reacting the precursor resin with lignin to form a lignin-modified phenol-formaldehyde precursor resin, and then reacting the lignin-modified phenol-formaldehyde precursor with additional formaldehyde sufficient to provide a cumulative formaldehyde to phenol mole ratio of between about 2.0 and about 3.0. The adhesive composition is useful in bonding wood chips, veneers and sheets of plywood.

45 Claims, No Drawings

OTHER PUBLICATIONS

Chem. Abstr., CA103(10):72248e, El'bert et al., 1985.
Chem. Abstr., CA101(22):193292g, Nicolau et al., Apr. 30, 1983.
Chem. Abstr., CA101(16):132813f, Sokolova et al., 1984.
Chem. Abstr., CA100(12):87589d, Janiga, Dec. 27, 1983.
Chem. Abstr., CA94(10):66865h, Mitsui Toatsu Chemicals, Inc., Oct. 25, 1980.
Chem. Abstr., CA92(10):77511z, Herault, Dec. 4, 1979.
Chem. Abstr., CA91(2):6697h, Forss et al., Apr. 26, 1979.
Chem. Abstr., CA90(16):122680a, Allan, Nov. 28, 1978.
Chem. Abstr., CA83(14):116020z, Felicetta et al., May 27, 1975.
Chem. Abstr., CA81(24):153607a, Wennerblom et al., Aug. 29, 1974.
Chem. Abstr., CA81(14):79593z, Roffel, 1974.
Chem. Abstr., CA80(26):147112y, Sakakibara, Jan. 9, 1974.
Chem. Abstr., CA109(6):39623z, Calve et al., 1988.
Chem. Abstr., CA107(10):79788z, Lyubavskaya et al., 1987.
Chem. Abstr., CA108(12):96465c, Ors et al., 1987.
"Karatex Adhesive" Brochure (undated).
Forss, "Pulp And Paper Industry—An Unexploited Field For Membrane Technology", The Finnish Pulp and Paper Research Institute, DDS Membrane Filtration Seminar, Apr. 1982.
Kirkman et al., "Kraft lignin recovery by ultrafiltration: Economic Feasibility and Impact on the Kraft Recovery System", Tappi Journal, vol. 69, Issue No. 5, (1986) pp. 110-114.
Gardner et al., "Formulation of a Lignin-Based Plywood Adhesive from Steam-Exploded Mixed Hardwood Lignin", Forest Products Journal, vol. 36, No. 5 (1986) pp. 61-67.
Olivares et al., "Kraft Lignin Utilization in Adhesives", Wood Science and Technology, vol. 22 (1988) pp. 157-165.
Gillespie, "Durable Wood Adhesives from Kraft Lignin", Chap. 9, American Chemical Society, (1989) pp. 112-125.
Cook et al., "Organosolv Lignin-Modified Phenolic Resins", Chap. 24, American Chemical Sociey, (1989) pp. 324-333.
Forss, "Finnish Plywood, Particleboard, And Fiberboard Made With a Lignin-Base Adhesive", Forest Products Journal, vol. 29, No. 7 (1979) pp. 39-43.

LIGNIN MODIFIED PHENOL-FORMALDEHYDE RESINS

BACKGROUND OF THE INVENTION

1. Field of the Invention

The invention relates to a lignin modified, and especially a lignosulfonate-modified, phenol-formaldehyde resin useful in adhesive compositions for making boards such as plywood, particle board and the like, for use in a binder for insulation and in other molded objects.

2. Description of Related Art

The manufacture of plywood, hardboard, particleboard and the like are well known in the art. Generally these boards are produced using cellulosic materials such as wood veneer, random geometric configuration wood chips, or wood fibers. The boards may be formed of a single homogeneous ply or may be multi-ply. Generally these board products are manufactured using an adhesive which cures under the application of heat and pressure for predetermined time periods to form the finished product.

The hot press conditions used to consolidate board products may vary widely depending upon such operating factors as type of panel, thickness of panel, etc. Press temperatures often range from about 120° C. to 320° C. (about 250° F. to 600° F.), such as about 170° C. (about 330° F.), press forming pressures often vary from about atmospheric up to about 70 kg/cm$^2$ (about 1000 psi), such as from about 3.5 kg/cm$^2$ to about 14 kg/cm$^2$ (about 50 psi to about 200 psi), and press time periods often vary from about one minute to about ten minutes.

Many types of adhesive glue systems have been used or proposed to form such products. Two well known systems are the phenol-formaldehyde resole resin system and the urea-formaldehyde resin system. Since the base resin used in these adhesive glue systems generally constitutes the major proportion of the manufacturing cost, extenders, fillers and the like have been used commercially to reduce the cost of the adhesive glue. Extenders and fillers typically are used to reduce the amount of costly resin solids in the adhesive glue. The prior art also has proposed the use of reactive extenders, such as sulfonated lignin materials (lignosulfonates), as partial replacement for the phenol or formaldehyde used in resin preparation. Unfortunately, known lignin-based extenders and fillers have not been highly successful due to the fact that the resulting strengths of the board products using such materials as well as other board properties, are generally impaired.

For a satisfactory performance, adhesive glues for making plywood must satisfy certain working characteristics under modern production methods in addition to having the appropriate cured adhesive properties. Thus, even though good bond strengths may be possible under certain conditions with particular resin adhesives, the resin adhesives still may not be suitable for use in an adhesive glue for bonding wood composites if the adhesive working characteristics are such that good bond strengths cannot be readily achieved under accepted methods employed in the application. Therefore, there remains a need in the art for an economically attractive lignin-modified resin useful in an adhesive glue having good strength characteristics, a sufficient latitude in working properties and the ability to maintain its strength when wet.

The use of lignin-modified, and particularly lignosulfonate-modified, phenol-formaldehyde resole resins in adhesive compositions for bonding sheets of wood together is known. Lignosulfonate-modified phenol-formaldehyde resins also have found use as fluid control agents. U.S. Pat. No. 3,095,392 to Herrick, discloses a method of making phenol-formaldehyde resins modified with lignosulfonate prepared at a formaldehyde to phenol mole ratio in the range of from 2.0 to 3.0. According to this technology, a methylolphenol resin first is prepared by reacting phenol and formaldehyde at the above-mentioned formaldehyde to phenol mole ratio, and then the resin is further condensed with lignosulfonate under an alkaline condition to produce the modified resin.

U.S. Pat. No. 3,658,638 to Ludwig, discloses the preparation and use of a lignosulfonate-modified phenol-formaldehyde resin as an adhesive in the manufacture of plywood and particleboard. According to Ludwig, an alkali metal lignosulfonate and a phenol first are pre-reacted under an alkaline condition, and then the lignosulfonate-phenol adduct is reacted with formaldehyde in the presence of an alkali metal hydroxide to condense the lignosulfonate-phenol product with formaldehyde. Ludwig indicates that up to about half of the phenol normally used to prepare a resole resin may be substituted with lignosulfonate.

U.S. Pat. No. 3,931,072 to Coyle, discloses a method of making an improved adhesive resin composition in which lignin sulfonate first is reacted with formaldehyde under the influence of caustic and heat and then the resulting product is reacted with a phenol-formaldehyde resole resin previously prepared using standard procedures. U.S. Pat. No. 4,105,606 to Forss, discloses a method of making an adhesive resin composition comprising adding either alkali lignin or lignosulfonate and formaldehyde together to a preformed phenol-formaldehyde resole resin. U.S. Pat. No. 4,303,562 to Hollis, discloses a method of making an adhesive resin composition wherein a lignin-phenol concentrate, formaldehyde and sodium hydroxide are added to a preformed phenol-formaldehyde resin. U.S. Pat. No. 4,701,383 to Janiga, discloses a method of manufacturing a lignosulfonatephenol-formaldehyde resin by mixing lignosulfonate with phenol before any substantial condensation reaction between phenol and formaldehyde.

DESCRIPTION OF THE INVENTION

The present invention is based on the discovery that a lignin-modified, and particularly a lignosulfonate-modified, phenol-formaldehyde resole resin prepared by reacting a phenol-formaldehyde precursor resin, itself prepared at a low formaldehyde to phenol mole ratio, with a lignin, generally followed by further reaction with formaldehyde, possesses adhesive characteristics similar to conventional phenol-formaldehyde resins. In accordance with the invention, a phenol-formaldehyde precursor resin is prepared at a formaldehyde to phenol (F/P) mole ratio of less than about 1.0, preferably less than about 0.7, by reacting the formaldehyde and phenol under alkaline conditions and reacted with a lignin source. Usually, the alkalinity is just sufficient to provide a mole ratio of alkaline material (moles of OH$^-$) to phenol during preparation of the precursor resin within the range of about 0.04 to about 0.08 (hereinafter referred to as A/P), i.e. a low level of alkalinity. The alkaline material may derive from an alkali lignin, such as a Kraft lignin, or may be separately added. In the case of a lignosulfonate-modified resin, the temperature of the precursor resin preferably is raised to about 100° C., and then the lignosulfonate is added to the alkaline mixture in a controlled manner to form a lignin-modified phenol-formaldehyde precursor resin. The lignin-modified phenol-formaldehyde precursor resin can be stored for limited periods and then generally is reacted, also under alkaline reaction conditions, with sufficient additional formaldehyde to provide a cumulative formaldehyde to phenol mole ratio in the final resin of between about 2.0 and 4.0, generally between 2.0 and 3.0.

A lignin-modified phenol-formaldehyde resole resin made in accordance with the present invention is useful in preparing an adhesive composition for bonding veneer sheets to make plywood or other laminated wood products together, for laminating wood veneers, or for bonding wood chips together to produce particleboard. Plywood, laminated wood veneers, and particleboards manufactured with an adhesive composition made in accordance with the present invention have a combination of superior bond strength, less wood failure and improved water resistance relative to products made with adhesives based on other lignin-modified phenol-formaldehyde resins not made in accordance with the present invention. Furthermore, adhesives made in accordance with the invention have improved curing characteristics as well as improved bond strengths.

A lignin-modified phenol-formaldehyde resole resin made in accordance with the method of the present invention has been found to be particularly useful in preparing adhesive compositions. In addition to its use in plywood glues, the lignin-modified resins of the present invention also are useful in preparing binders for insulation mats. The method of the invention is carried out by preparing a phenol-formaldehyde precursor resin by reacting formaldehyde and phenol under alkaline reaction conditions at a formaldehyde to phenol (F/P) mole ratio of less than about 1.0, and preferably less than about 0.7.

Preferably, hydroxybenzene (phenol) is the phenol reactant of choice, although substituted phenols such as cresol and higher functional phenols such as resorcinol or bisphenol-A, can be used, usually in combination with standard phenol. Formaldehyde is the preferred aldehyde constituent. Generally, the formaldehyde is supplied as an aqueous solution known in the art as "formalin". Formalin generally contains from about 37% to about 50% by weight formaldehyde. Other forms of formaldehyde such as paraformaldehyde also can be used. Other aldehydes, which may be used in lieu of, or more usually in combination with formaldehyde, include aliphatic aldehydes such as acetaldehyde and propionaldehyde; aromatic aldehydes such as benzylaldehyde and furfural and other aldehydes such as aldol, glyoxal and crotonaldehyde.

In accordance with the method of the invention, the phenol and formaldehyde are reacted to obtain a phenol-formaldehyde precursor resin, prepared at an F/P mole ratio of less than about 1.0. As is known, when the phenol and formaldehyde are reacted, the formaldehyde may react at the ortho- or para- position of the phenol to produce ortho-methylolphenols, paramethylolphenols, dimethylolphenols and other higher methylolphenols.

The amounts of phenol and formaldehyde employed in preparing the precursor resin should be sufficient to maintain a F/P mole ratio of less than about 1.0. Usually, the phenol-formaldehyde precursor resin is prepared at a F/P mole ratio of between about 0.1 to about 0.7, more usually, between about 0.2 to about 0.5, and often at about 0.3. To achieve such a F/P mole ratio, phenol typically is added in an amount ranging from about 10 wt % to about 30 wt % based on the total weight of the lignin-modified phenol-formaldehyde resole resin to be prepared. Usually the phenol is added in an amount within the range of from about 15 wt % to about 25 wt %, more usually, within the range of from about 18 wt % to about 23 wt %, and most often at about 21 wt %.

The amount of a 50 wt % formaldehyde solution typically added in the formation of the phenol-formaldehyde precursor resin ranges from about 3 wt % to about 12 wt % based on the total weight of the lignin-modified phenol-formaldehyde resole resin to be prepared. Usually, the 50 wt % formaldehyde solution is added in an amount falling within the range of from about 4 wt % to about 9 wt %, and more usually within the range of from about 4.5 wt % to about 7 wt %.

For forming the precursor resin, the phenol and formaldehyde reactants typically are allowed to react for a period of time within the range of about 1 minute to about 30 minutes, the time depending to some extent on the alkalinity of the reaction mixture. Higher levels of alkalinity would require shorter reaction times. Usually, the phenol and formaldehyde are allowed to react for a period of time within the range of from about 3 minutes to about 15 minutes, and more preferably, for a period of time within the range of from about 5 minutes to about 10 minutes. The reaction between phenol and formaldehyde is exothermic, and the temperature during the period of time the reactants are allowed to react typically rises from about ambient temperatures to about 60° C. Preferably the reaction temperature is kept within the range of from about 45° C. to about 55° C. during preparation of the precursor resin.

In order to facilitate the reaction of phenol and formaldehyde, the reactants are first heated to about 45° C. to about 50° C., and then an alkaline material is added to the reactants in an amount sufficient to provide an alkaline (OH) to phenol (A/P) mole ratio of between 0.04 and 0.08. Typically, alkaline material is added in an amount within the range of from about 0.25 wt % to about 1.0 wt % based on the total weight of the lignin-modified phenol-formaldehyde resole resin to be prepared. Usually, the alkaline material is added within the range of from about 0.35 wt % to about 0.7 wt %, and often within the range of from about 0.40 wt % to about 0.50 wt %.

The alkaline material preferably is added slowly to the mixture of phenol and formaldehyde, while carefully cooling the reactants to control the exothermic reaction. The alkaline material acts as a catalyst to generate methylolphenol as part of the precursor resin. The temperature is controlled so that the temperature of the reaction is allowed to reach about 50° C. to about 65° C.

Any alkaline material may be used in the method of the present invention. Typical alkaline materials which may be used in the present invention include sodium hydroxide, potassium hydroxide, magnesium hydroxide, and the like. Preferably, sodium hydroxide or potassium hydroxide are used, and most preferably, sodium hydroxide is used. As mentioned above, the alkalinity in forming the precursor resin may derive in whole or in part from an alkali lignin such as a Kraft lignin and the like, and thus, it may not be necessary to add a separate alkaline material in the initial step of forming the precursor resin when the invention is carried using Kraft lignin, for example.

The pH of the aqueous phenol-formaldehyde reaction mixture after addition of the alkaline material must be above 7, and generally is within the range of from about 8 to about 11, and preferably is within the range of from about 9 to about 10. Preferably, the preparation of the phenol-formaldehyde precursor resin is conducted to yield a resin having the following molecular weight distribution: a number average molecular weight ($M_n$) within the range of from about 125 to about 225, preferably within the range of from about 150 to about 200, and more preferably within the range of from about 170 to about 185; a weight average molecular weight ($M_w$) within the range of from about 150 to about 300, preferably within the range of from about 175 to about 250, and more preferably within the range of from about 190 to about 225; and a z average molecular weight ($M_z$) within the range of from about 185 to about 325, preferably within the range of from about 200 to about 275, and more preferably within the range of from about 225 to about 250. In other words, only low molecular weight methylol species are desired. The molecular weights can be determined using a Polymer Laboratories Gel Column at about 40° C., with tetrahydrofuran as the solvent, a flow rate of about 1.0 ml/min., and with polystyrene and phenol as the standards. Discussions on polymeric molecular weight distributions, their methods of measurement and their significance can be found by reference to any polymer chemistry manual or publication. For example, reference may be made to Stevens, M. P., *Polymer Chemistry an Introduction*, Addison-Wesley, 1980; Bikales, N. B., *Characterization of Polymers*, Wiley-Interscience, 1971; Brandrup, J. et al., Polymer Handbook, 2nd Ed., Wiley-Interscience, 1975.

The temperature of the reaction mixture comprising the phenolformaldehyde precursor resin may be slowly increased to about 100° C. The rate at which the temperature of the reaction mixture is increased may vary, but usually, the rate is controlled within the range of from about 1.0° C. to about 2.5° C. per minute. More usually, the temperature of the reaction mixture is increased at a rate within the range of from about 1.5° C. to about 2.0° C. per minute, and often within the range of from about 1.5° C. to about 1.75° C. per minute.

At this point, sufficient phenol has reacted with formaldehyde such that the resin is comprised predominantly of a mixture of methylolphenols, dimethylolphenols, and free phenol. Permitting the reaction to proceed further may result in undesired polymerization of the methylolphenols. While not intending to be bound by any theory, it is believed that addition of a lignin source, such as lignosulfonate, to the alkaline precursor resin results in a reaction between the lignin, such as lignosulfonate, and the methylolphenols. Therefore, permitting the methylolphenols to polymerize further at this point may hinder the lignin substitution.

Generally, when at least anywhere from about 5% to about 30% by weight of methylolphenols have been formed as part of the precursor resin, the precursor resin may be reacted with the lignin source. If an alkali lignin, such as a Kraft lignin, is used as the lignin source, it is convenient to react the phenol and formaldehyde to form the precursor resin in the presence of the lignin source. In this case, the lignin reacts with the methylolphenols as they are formed. Hence, the phenol-formaldehyde precursor resin and the lignin-modified phenolformaldehyde precursor resin discussed below are formed substantially at the same time in the reactor.

In accordance with the present invention, various forms of lignin can be used to prepare the modified resin. Lignosulfonates which may be used in the method of the present invention include sulfonated lignin, such as sulfonated Kraft lignin or sulfite lignin. Kraft lignin and Ultrafiltered Kraft lignin, both of which have not been sulfonated, also may be used. The term "Kraft lignin" refers generally to the lignin material which typically is recovered from alkaline pulping black liquors, such as are produced in the Kraft, soda, and other well known alkaline pulping operations. The term "ultrafiltered Kraft lignin" refers to the product obtained by ultrafiltration of the lignin material recovered from alkaline pulping black liquors and the like. Preferably, the ultrafiltered Kraft lignin typically represents a lignin fraction comprising molecules of the aqueous lignin solution which, when subjected to ultrafiltration, pass through an upper molecular weight cut-off ultrafiltration membrane and are rejected by a lower molecular weight cut-off ultrafiltration membrane. Thus, the preferred ultrafiltered Kraft lignin represents the lignin fraction having a molecular weight range near the center of the Kraft lignin molecular weight distribution. The term "sulfonated lignin" refers to the product obtained by the introduction of sulfonic acid groups into the Kraft lignin molecule, as may be accomplished by reaction of the Kraft lignin with sulfite or bisulfite compounds, so that Kraft lignin is rendered soluble in water. The term "sulfite lignin" refers to the reaction product of lignin which is inherently obtained during the sulfite pulping of wood, and is a principle constituent of spent sulfite liquor.

Any type of lignin, i.e., hardwood, softwood, crude or pure may be employed in the method of the invention. One of the main lignin sources is residual pulping liquors obtained in the pulp and paper industry where lignocellulosic materials such as wood, straw, corn stalks, bagasse, and the like are processed to recover the cellulose or the pulp. In the sulfite or bisulfite pulping processes, the lignocellulosic material is digested with a sulfite or bisulfite solution to obtain a lignosulfonate product commonly referred to as "spent sulfite liquor" containing sulfonated lignin as its major constituent. These pulping liquors may also contain carbohydrates, degradation products of carbohydrates, and resinous materials as well as other organic and inorganic compounds besides the sulfonated lignins. While all or part of these other materials may be removed, it is not necessary to do so. For example, the liquor may be fermented to remove the carbohydrates or fractionated by dialysis, solvent extraction, or other means to obtain not only a substantially purified lignosulfonate product, but a product in a particular molecular weight range. Thus, the term "lignin" as used herein, includes purified sulfonated lignins, unpurified sulfonated lignin products such as spent sulfite liquors, Kraft lignin, and ultrafiltered Kraft lignin.

The sulfonated lignins, such as obtained in the pulping liquors, are salts of the base used in the pulping operation or in the sulfonation reaction. Thus, in pulping operations employing calcium or magnesium as the metal base, the pulping liquor may be processed to convert the liquor to an alkali metal salt, generally to a sodium or potassium salt. Various known methods such as ion exchange or base exchange may be conveniently used. For example, a calcium base spent sulfite liquor may be treated with sodium sulfate converting the product to the sodium salt and precipitating the calcium as calcium sulfate.

Usually, the lignin source is present in the form of ultrafiltered Kraft lignin or lignosulfonate. More usually, the lignin source is present in the form of a lignosulfonate. Typical lignosulfonates which may be used in accordance with the method of the invention include, but are not limited to, calcium lignosulfonates, sodium lignosulfonates, ammonium lignosulfonates, modified lignosulfonates, and mixtures or blends thereof. Lignosulfonates are available from numerous sources in either aqueous solution or dried powder forms. Lignosulfonates other than calcium, sodium, or ammonium lignosulfonate include, but are not limited to, zinc, magnesium, iron, and copper lignosulfonate. Furthermore, any commercial lignosulfonate including different bases, which may be fermented or unfermented, are within the scope of the present invention.

In accordance with the method of the invention, the lignin is added to the alkaline precursor resin, or to the mixture of formaldehyde and phenol in a controlled manner. The temperature of the reaction mixture while the lignin is added may vary from about 50° C. to about 110° C. To avoid having to use a pressurized reaction vessel, the reaction mixture during lignin addition usually is held at a temperature of not greater than about 100° C. The term "controlled manner" refers generally to the addition of incremental amounts of the lignin over a period of time. The objective of this controlled addition is to promote coreaction with the methylolphenol present in the phenol-formaldehyde precursor resin, and to maximize the phenol/lignin concentration at any stage during the lignin addition.

Typically, the lignin is added to the precursor resin over a period of time within the range of from about 20 minutes to about 80 minutes. Usually, the lignin is added to the precursor resin over a period of time within the range of from about 30 minutes to about 60 minutes, and more usually within the range of from about 30 minutes to about 45 minutes. For example, if the lignin is to be added over a period of 60 minutes, then incremental amounts of the lignin would be added every one to five minutes with stirring until all of the lignin has been added at the end of the 60 minutes. For example, if 500 grams of lignin were to be added over a 60 minute interval, about 42 grams of lignin would be added about every 5 minutes.

Ostensibly, the lignin added in the preparation of the modified resole resin of the present invention replaces a portion of the phenol and formaldehyde conventionally used in the preparation of a phenol-formaldehyde resin. Typically, about 15% to about 30% of the phenol conventionally used may be replaced by the lignin. Preferably, about 17% to about 25% of the phenol is replaced by the lignin, and more preferably, about 18% to about 20% of the phenol is replaced by the lignin. In order to achieve this degree of replacement, the lignin, when added in the form of a 50 wt % solution, is added in an amount within the range of from about 5 wt % to about 20 wt % based on the total weight of the lignin-modified phenol-formaldehyde resole resin to be prepared. Preferably, the lignin is added in an amount within the range of from about 11 wt % to about 13 wt %, and most preferably, about 12 wt %.

To obtain this level of lignin usage, the lignin typically is added in an amount so that the cumulative formaldehyde to (phenol plus lignin),(F/(P+L)), mole ratio is within the range of from about 2.0 to about 3.5 usually between about 2.0 to about 2.4. Preferably, for a resin used in a plywood adhesive the F/(P+L) mole ratio is within the range of from about 2.2 to about 2.3, and more preferably, within the range of from about 2.2 to about 2.25.

Once the lignin addition is completed, the reaction mixture is held at about 100° C. for about one additional hour. The holding period may vary between about 30 minutes and 1.5 hours depending on the properties such as viscosity, desired in the ultimate resin. During this time, additional alkaline material and water may be added to the reaction mixture maintains a cumulative A/P mole ratio within the range of from about 0.04 to about 0.08. Water may be added not only to cool the reaction mixture, but also to adjust the viscosity of the lignin-modified phenol-formaldehyde (PFL) precursor resin. Typically, the viscosity of the PFL precursor resin is targeted within the range of from about 50 to 100 centistokes. The PFL precursor reaction mixture then is cooled to a temperature within the range of from about 20° C. to about 45° C.; preferably to a temperature within the range of from about 25° C. to about 40° C.

The pH of the lignin-modified phenol-formaldehyde precursor resin mixture after further addition of alkali typically is within the range of from about 8 to about 13, and preferably is within the range of from about 10 to about 12. The lignin-modified phenol-formaldehyde precursor resin thus produced may be cooled to 20° C. to about 25° C., and stored at about 25° C. to about 30° C. for future use or immediately reacted into an adhesive resin condensate. Typical storage times range from about 2 to about 6 days, and more preferably no more than about 4 to about 5 days. The lignin-modified phenol-formaldehyde precursor resin generally has the following molecular weight distribution: a number average molecular weight ($M_n$) within the range of from about 180 to about 250, preferably within the range of from about 190 to about 240, and more preferably within the range of from about 200 to about 225; a weight average molecular weight ($M_w$) within the range of from about 3,600 to about 14,000, preferably within the range of from about 3,800 to about 8,000, and more preferably within the range of from about 4,000 to about 6,000; and a z average molecular weight ($M_z$) within the range of from about 42,000 to about 75,000, preferably within the range of from about 43,000 to about 60,000, and more preferably within the range of from about 44,000 to about 56,000. The molecular weights can be determined using a Polymer Laboratories Gel Column at about 25° C., with 0.15% ammonium formate in dimethylformamide as the solvent, a flow rate of about 1.0 ml/min., and with polyethylene oxides and polyethylene glycols as the standards.

When Kraft lignin, or ultrafiltered Kraft lignin is used as the lignin source, the use of alkaline material is not required in the initial preparation of the phenol-formaldehyde precursor resin. The reason for this is that the alkalinity of the ultrafiltered Kraft lignin or Kraft lignin is sufficient to drive the reaction. Furthermore, the temperature of the reactants need not reach a temperature of 100° C. before controlled lignin addition, although it is preferred that the temperature reach about 100° C. before or shortly after lignin addition is started. Finally, because Kraft lignin typically is added to a mixture of formaldehyde and phenol, the formation of the phenol-formaldehyde precursor resin and the lignin-modified, phenol-formaldehyde precursor resin occurs substantially simultaneously.

Upon cooling the PFL precursor resin, or after storage, additional formaldehyde is added in an amount sufficient to bring the cumulative F/P mole ratio to within the range of from about 2.0 to about 4.0, usually between about 2.0 and about 3.0. The pH of the PFL precursor resin during final formaldehyde addition typically is within the range of about 8.5 to about 10.0, usually, between 9 and 9.5. Preferably, sufficient formaldehyde is added to bring the cumulative F/P mole ratio within the range of from about 2.3 to about 2.6, more preferably, within the range of from about 2.4 to about 2.6, and most preferably within the range of from about 2.4 to about 2.5. The formaldehyde is added over a period of time within the range of from about 20 minutes to about 50 minutes. Preferably, the additional formaldehyde is added over a period of time within the range of from about 25 minutes to about 40 minutes, and more preferably, within the range of from about 30 minutes to about 35 minutes. The addition of formaldehyde causes an exothermic reaction which is controlled so that the temperature of the reactants typically remains below 100° C.

Additional alkali then may be added to the final lignin-modified phenol-formaldehyde resin to raise the level of alkalinity to the typical range of 1 to 15 wt %. The reaction is quenched so that the final resin typically has a viscosity within the range of from about 700 to about 1000 centistokes, and a pH within the range of from about 10 to about 13. The molecular weight distribution of the final lignin-modified phenol-formaldehyde resin typically is within the following ranges: a number average molecular weight ($M_n$) within the range of from about 3000 to about 5000, preferably within the range of from about 4000 to about 5000, and more preferably within the range of from about 4300 to about 4600; a weight average molecular weight ($M_w$) within the range of from about 15,000 to about 30,000, preferably within the range of from about 20,000 to about 27,000, and most preferably within the range of from about 21,000 to about 26,000; and a z average molecular weight ($M_z$) within the range of from about 42,000 to about 75,000, preferably within the range of from about 45,000 to about 67,500, and more preferably within the range of from about 50,000 to about 65,000. The molecular weights can be determined using a Polymer Laboratories Gel Column at about 25° C., with 0.15% ammonium formate in dimethylformamide as the solvent, a flow rate of about 1.0 ml/min., and with polyethylene oxides and polyethylene glycols as the standards.

The resole resin finally is cooled to ambient temperatures, and typically is stored for a period of time at about 25° C. before use as an adhesive component. During this final cooling of the lignin-modified phenol-formaldehyde resole resin (PFLF) additional alkali may be added. The gel time of the PFLF resin is typically within the range of from about 15 to about 30 minutes, preferably within the range of from about 17 to about 25 minutes, and more preferably within the range of from about 18 to about 20 minutes. The gel time is calculated by using a Sunshine Gel Timer which generally comprises placing a small sample (about 10 grams) of the resin in a test tube (20 mm), and the test tube is submerged in boiling water. Inside the test tube is a rotating glass stirring rod. The gel time is determined by the time it takes the resin to gel sufficiently to stop the rotation of the glass rod. Gel time represents a rough indicator of cure time for the resin.

PFLF resin made in accordance with the present invention typically can be stored for about 1 to about 10 days before use. Preferably, the PFLF resin is stored at 25° C. for a period of about 2 to about 7 days, and more preferably, for no more than about 3 to about 5 days.

Adhesives made with the PFLF resin of the invention typically contain other known and conventional additives such as fillers and extenders. Typical fillers and extenders include chalk, quebracho, wood flour, wheat, and wheat flour. Also, typical hardeners such as additional formaldehyde, paraformaldehyde, and furfural may be added to the adhesive composition along with the PFLF modified resin.

Adhesives made in accordance with the invention may be applied to any type of particleboard, pressboard, plywood or the like. Additionally, the adhesives made in accordance with the invention are useful on wood veneers and multiple panel plywoods.

Throughout the specification and the claims, the terms "about" and "approximately" represent the value referred to with certain range of accuracy, such as ±5%. Skilled practitioners recognize that this phrase is commonly used to account for experimental error and commercial variability.

EXAMPLES

Throughout the Examples, all parts by weight are relative to 100 parts by weight phenol.

EXAMPLE 1

Preparation of Sample A

A lignosulfonate-modified phenol-formaldehyde resin was made according to the following procedure.

A reaction vessel equipped with an efficient cooling system, a stirrer and reflux condenser was charged with approximately 100 parts by weight (pbw) of phenol, and 19.1 pbw of 50 wt % formaldehyde at about 29° C. To these reactants were added approximately 3.1 pbw of a 50 wt % sodium hydroxide solution. The temperature of the ensuing exothermic reaction reached about 50° C. in about 35 minutes. The exothermic reaction then was allowed to increase the temperature gradually at a rate of about 1.67° C./min to reach a final temperature of about 100° C. in 30 minutes. The formaldehyde to phenol (F/P) mole ratio of the resulting precursor resin was about 0.6, and the sodium hydroxide to phenol (A/P) mole ratio was about 0.04.

To the hot precursor resin, approximately 49.8 pbw of 50 wt % aqueous solution of Lignosite ® 431H sodium lignosulfonate were added, with agitation over a 30 minute interval. The temperature of the reaction mixture was kept at 100° C. over the 30 minute lignosulfonate addition period. Approximately 3.1 pbw of additional 50 wt % sodium hydroxide then was added, and the reaction mixture was held at 100° C. for about 45 minutes. The cumulative A/P mole ratio of the lignosulfonate-phenol-formaldehyde precursor resin now was about 0.07. To the hot lignosulfonate-phenol-formaldehyde precursor resin, approximately 83 pbw of water also were added, and the reaction was cooled to about 40° C. in about 15 minutes.

Upon cooling the lignosulfonate-phenol-formaldehyde precursor resin, approximately 135 pbw of additional 50 wt % formaldehyde were added over a 30 minute period. The temperature during the 30 minute formaldehyde addition period was increased to about 80° C., and the reaction mixture was held for about 10 additional minutes while the temperature rose to about 100° C. The lignosulfonate-modified phenol-formaldehyde resin mixture then was cooled to about 80° C., and approximately 19.6 pbw of additional 50 wt % sodium hydroxide were added, and the reaction mixture was held at about 80° C. for about 2 hours. The reaction mixture then was cooled to about 60° C., and approximately 0.4 pbw of tall oil fatty acid was added to the liquid resin to lower its surface tension. The final resin then was cooled to room temperature and spray dried.

The final resin had a cumulative F/P mole ration of about 2.4, and a formaldehyde to phenol and lignosulfonate (F/(P+L)) mole ratio of about 2.2 based on a lignosulfonate molecular weight of about 229 g/mol. The viscosity of the resin was about 320 cps, and the 100° C. gel time of the resin (measured using the procedure outlined above) was approximately 19 minutes. This lignosulfonate-modified phenol-formaldehyde resole resin was labeled Sample A.

EXAMPLE 2

Preparation of Sample B

The preparation protocol of Example 1 was repeated except the following changes were made in the precursor resin mole ratios, the A/P mole ratios, and the resin cook times. The phenol-formaldehyde precursor resin was prepared at a F/P mole ratio of 0.3, and an A/P mole ratio during preparation of the precursor resin of about 0.04. The formaldehyde reacted at various sites on the phenol, and the amounts of reacted phenols were measured. The amount of ortho-methylolphenols in the phenol-formaldehyde precursor resin was determined to be about 15%, while the amount of para-methylolphenols was about 6%.

Sufficient additional 50 wt % sodium hydroxide was added during preparation of the lignosulfonate-modified precursor resin to provide a cumulative A/P mole ratio of about 0.08, and the resin was cooked after lignosulfonate addition for about 30 to about 45 minutes at 100° C. The final formaldehyde addition resulted in a lignosulfonate-modified phenol-formaldehyde resole resin having a cumulative F/P mole ratio of about 2.46, and a F/(P+L) mole ratio within the range of about 2.2 to about 2.25 (assuming an average lignosulfonate molecular weight of about 229). The product resin had a 100° C. gel time of about 18 to about 20 minutes. The total amount of sodium hydroxide was about 5.4 to about 5.8 wt % based on the overall weight of the resin, the percentage of water insolubles after curing at 125° C. for 45 minutes amounted to about 85%, and the phenol substitution (replacement) was about 18% compared to a standard phenol-formaldehyde resole resin. This lignosulfonate-modified phenol-formaldehyde resin was labelled Sample B.

EXAMPLE 3

Preparation of Sample C

Phenol (100 pbw) and 50 wt % formaldehyde (12.9 pbw) were initially charged to a reaction vessel equipped with efficient cooling, heating, and mixing capabilities. The phenol and formaldehyde mixture, at a F/P mole ratio of about 0.2, was heated to within the range of about 45° C. to about 50° C. Then about 6.8 pbw of a 50 wt % sodium hydroxide solution, an amount sufficient to provide an A/P mole ratio of about 0.08, were added over 5 minutes with sufficient cooling to dissipate the reaction exotherm. The temperature of the reactants was allowed to reach a temperature of about 65° C. The reaction mixture then was heated at a rate of about 1.5° C. to about 1.75° C. per minute until a temperature of about 100° C. was reached (about 20 minutes). The phenol-formaldehyde precursor contained about 3.2% to about 4.0% of para-methylolphenols, about 10.1% to about 12.2% of ortho-methylolphenols, and 63% to 64.4% free phenol.

Once the reactants reached a temperature of about 100° C., about 53.8 pbw of a 50 wt % aqueous solution of modified Lignosite ® 431H sodium lignosulfonate were added over a 30 minute period. The Lignosite ® 431H sodium lignosulfonate was modified by addition of about 1.2 wt % of NaOH, and the pH was adjusted to about 5.0 to 5.8. The reaction mixture then was held at about 100° C. for about 60 minutes to form the lignosulfonate-modified phenol-formaldehyde precursor resin. The thus produced precursor resin then was cooled to room temperature and reacted into an adhesive resin condensate according to the method outlined below.

The adhesive resin condensate was formulated by adding approximately 174 pbw of the lignosulfonate-modified phenol-formaldehyde precursor resin, 95.1 pbw of water, a wheat flour premix (3.4 pbw of wheat flour in about 15.2 pbw of water), and approximately 57.4 pbw of formaldehyde to a reactor, stirring the reactants, and heating to within the range of about 50° C. to about 55° C. To this reaction mixture, approximately 9.4 pbw of 50 wt % sodium hydroxide were added over a 15 minute interval, and the reaction mixture was allowed to reach a temperature of about 85° C. Over the following 30 minute interval, approximately 86.2 pbw of additional 50 wt % formaldehyde solution were added, and the reaction temperature was maintained at about 85° C. After the formaldehyde addition, the reaction temperature was allowed to reach 96° C., and was held at this temperature until the resin viscosity reached about 80–90 centistokes. Upon reaching this viscosity, the resin then was cooled to about 85° C. over a 10 minute interval.

Upon cooling to about 85° C., approximately 17.7 pbw of a 50% sodium hydroxide solution were added, and the resin was cooked at this temperature until the viscosity of the resin reached a viscosity of about 550–627 centistokes. Approximately 20.8 pbw of a 50% sodium hydroxide solution then were added to the resin, and the resin was cooked at a reaction temperature of about 80° C. until a viscosity of about 627–885 centistokes was achieved. The resulting resin then was cooled to 25° C. The lignosulfonate-modified phenol-formaldehyde adhesive resin condensate was labelled Sample C.

COMPARATIVE EXAMPLE 1

Adhesive glue mixes prepared using Sample C were compared to adhesive glues made using a commercially available standard phenol-formaldehyde resin GP 4879 ® RESI-BOND ® Wood Product Resin. The properties of the two resins are set forth in Table I below.

TABLE I

| Resin Characteristics | Sample C | Control phenol-formaldehyde resin |
|---|---|---|
| F/P mole ratio | 2.45 | 2.05 |
| F/(P + L) mole | 2.20 | — |

TABLE I-continued

| Resin Characteristics | Sample C | Control phenol-formaldehyde resin |
|---|---|---|
| ratio | | |
| % Non-Volatile | 43-44% | 43-44% |
| % NaOH | 5-6 | 5.6-6.6 |
| 100° C. gel (min) | 19-20 | 23-24 |
| Viscosity (centistokes) | 625-900 | 625-900 |
| % Free Formaldehyde | <0.1 | <0.1 |

To demonstrate the plywood bonding efficiency of the resin made in accordance with the method of the present invention, plywood gluing comparisons were made with Douglas fir and Southern pine veneers. The composition of the glue mixes used for the Douglas fir and the Southern pine veneers are set forth in Table II below.

TABLE II

| Ingredient (g) | Douglas Fir Glue Mix | Southern Pine Glue Mix |
|---|---|---|
| Water | 294 | 294 |
| Wheat Flour | 130 | 9 |
| Modal (Douglas Fir) CO-COB (Southern Pine) | 63 | 66 |
| Soda Ash | 7 | 4 |
| Resin | 400 | 280 |
| 50% NaOH | 54 | 42 |
| Resin | 700 | 695 |
| Total | 1648 | 1400 |

The glue raw materials set forth in Table II above were added in the order listed to an efficient plywood glue mixer while maintaining glue mix homogeneity. The resin component was added at levels to contribute 28% and 30% resin solids, respectively, to the Douglas fir and Southern pine glue mixes. The Douglas fir plywood preparation conditions were as follows: 5 ply; 1.3 cm (½"); 1 panel per opening; 132° C. (270° F.) press temperature; 12.3 kg/cm² (175 psi) platen press pressure; 4 minute press time; 22-24 grams glue on a 30.5 cm ×30.5 cm (12"×12") veneer. The Douglas fir plywood was vacuum pressure tested for wood-failure. The results are set forth in Table III below. The Southern pine was treated in a similar manner. The preparation conditions for the Southern pine plywood were as follows: 3 ply; 0.95 cm (⅜"); 1 panel per opening; 149° C. (300° F.) press temperature; 12.3 kg/cm² (175 psi) platen press pressure; 4 minute press time; 34-36 grams glue on a 12"×12" veneer. Table III below shows the comparative wood-failure data from the above-mentioned plywood bond tests for both the Douglas fir and Southern pine. For each of the values listed below, 4 panels were tested for each condition, and the average value of the 4 panels is listed.

TABLE III

| | Douglas Fir | | Southern Pine | |
|---|---|---|---|---|
| Resin | 10 Min. Assembly Time | 45 Min. Assembly Time | 10 Min. Assembly Time | 45 Min. Assembly Time |
| C | 92% | 92% | 89% | 89% |
| Control PF | 95% | 80% | 92% | 63% |

As can be seen from the table, the adhesives made using the resins prepared in accordance with the method of the present invention are in some cases superior or at the least equivalent in wood bond performance to an adhesive made with a standard phenol-formaldehyde resin. The plywood prepared in accordance with the present invention, however, was prepared using an adhesive containing about 16.3% less phenol than the control adhesive, and for that reason is substantially more economical.

COMPARATIVE EXAMPLE 2

The lignosulfonate-modified phenol-formaldehyde resin made in accordance with Example 1 (i.e., Sample A), as well as other lignosulfonate-modified phenol-formaldehyde resins prepared according to various methods within the broad practice of the present invention listed below (Samples C1 and C2) were compared to a control phenol-formaldehyde resin (Sample C0), and a lignosulfonate phenol-formaldehyde resin not made in accordance with the method of the present invention (Sample C3).

A standard phenol-formaldehyde (control) resin was prepared by mixing about 100 pbw of phenol, about 35.1 pbw of a 50% by weight solution of formaldehyde, and about 83.7 pbw of water in a reactor such as that used in Examples 1-3. About 21.9 pbw of 50 wt % sodium hydroxide then were added over a fifteen minute interval, and the temperature of the reaction was allowed to reach about 65° C. The reactants then were allowed to sit for ten minutes while the temperature rose to about 75° C. At this point, about 106.1 pbw of additional 50 wt % formaldehyde were added over a 35 minute interval, and the reaction temperature rose to about 85° C. The mixture then was allowed to sit while the exotherm increased the temperature to about 99° C. over a 20 minute interval. The resulting resin then was cooled to room temperature, and stored. This phenol-formaldehyde resole resin is labelled sample C0, and the properties of the resin are set forth in TABLE IV below.

A lignosulfonate-modified phenol-formaldehyde resin was prepared in accordance with the present invention by mixing about 100 pbw of phenol, about 37.2 pbw of 50 wt % formaldehyde, and about 83 pbw of water in a reactor such as that used in Examples 1-3. After about 10 minutes, about 49.8 pbw of a 50 wt % aqueous solution of Lignosite ® 431 sodium lignosulfonate were added, and ten minutes later, about 6.2 pbw of 50 wt % sodium hydroxide were added. The reaction temperature was about 65° C. About 117.3 pbw of additional 50 wt % formaldehyde then were added over a 30 minute interval, and the reaction temperature reached about 85° C. The reaction mixture then was stirred for about 20 minutes, and the temperature reached about 99° C. The reaction mixture then was cooled, and about 19.6 pbw of 50 wt % sodium hydroxide solution were added, and the reaction mixture was held at about 85° C. for about one hour. The resin produced then was allowed to cool to room temperature, and was stored. The lignosulfonate-modified phenol-formaldehyde resin produced in this manner is labelled C1, and the characteristics of the resin are set forth in TABLE IV below.

Another lignosulfonate-modified phenol-formaldehyde resin was prepared in accordance with the present invention by mixing about 100 pbw of phenol, and about 19 pbw of 50 wt % formaldehyde solution in a reactor such as that used in Examples 1-3. To the reactants, about 49.8 pbw of a 50 wt % aqueous solution of Lignosite ® 431 sodium lignosulfonate and about 6.2 pbw of 50 wt % sodium hydroxide solution were added, and the mixture was heated to about 99° C. over a 30 minute interval. The mixture then was held for about 60 minutes. About 83.0 pbw of water were added, and the mixture was cooled to about 40° C. After about 10 minutes, about 135.5 pbw of additional 50 wt % formaldehyde solution were added over a 30 minute interval, and the reaction temperature reached about 99° C. The reactants then were stirred for about 10 minutes, and then cooled to about 80° C. About 19.6 pbw of additional 50 wt % sodium hydroxide solution then were added, and the reactants were heated to about 80° C. The resin produced then was allowed to cool to room temperature, and was stored. The lignosulfonate-modified phenol-formaldehyde resin produced is labelled C2, and the characteristics of the resin are set forth in TABLE IV below.

Finally, Sample C3 was formulated not in accordance with the present invention simply by adding lignosulfonate to Sample C0. The addition of lignosulfonate was accomplished simply by adding about 12 pbw of a 50 wt % aqueous solution of Lignosite® 431 sodium lignosulfonate to about 88 pbw of sample C0 in a reactor such as that used in Examples 1–3. The resin soproduced was labelled sample C3, and the characteristics of the resin are set forth in Table IV below.

The resulting particleboards were tested for board density, internal bond strength, 2-hr boil internal bond strength and thickness swell, and a 24-hr soak thickness swell and water retention. The results of the above test are set forth in Tables V and VI below.

The internal bond strength was measured using an ASTM D1037 test, and the boiled internal bond strength was measured using the same test on a board boiled for 2 hours, and dried overnight. The boiled thickness swell was determined by subtracting the initial thickness from the swelled thickness, dividing that by the initial thickness, and multiplying the value obtained by 100%. The water absorbed after a 24 hour water soak was measured in a similar manner as the boiled thickness swell only the initial and swelled weights of the boards were used. The radial cure was calculated by placing a 1.3 cm ($\frac{1}{2}$")×5 mm pellet of resin between a piece of foil and a glass plate, and placing the sandwiched pellet on a 140° C. hot plate. A 5.8 kg (13 lb) weight was placed on the pellet for about 2 minutes, and the radial flow was measured by subtracting the initial pellet diameter from the final pellet diameter, and dividing that value by 2. The stroke cure was measured by placing a 0.5 gram sample of resin on a 150° C. hot plate, manually stirring the sample until cured, and measuring the time elapsed.

TABLE IV

| Resin Characteristics | Sample A | Sample C0 | Sample C1 | Sample C2 | Sample C3 |
|---|---|---|---|---|---|
| F/P mole ratio | 2.42 | 2.22 | 2.42 | 2.42 | 2.22 |
| F/(P + L) mole ratio* | 2.20 | — | 2.20 | 2.20 | 2.02 |
| % Non-Volatile | 45.2% | 45.0% | 45.86% | 46.0% | 45.85% |
| % NaOH | 3.1% | 3.1% | 3.1% | 3.1% | 2.7% |
| 100° C. (gel min) | 19.1 | 20–23 | 24.1 | 23.0 | 20.4 |
| % Free Formaldehyde | 0.98 | 0.69 | 0.29 | 0.70 | 0.65 |

*molecular weight of lignosulfonate was about 229 g/mol.

TABLE V

| Sample | Mat Mois. (%) | Press Time Total (min) | Press Time /.16 cm (sec)[1] | Panel DEN avg. (g/cm$^3$) | Internal Bond DEN avg. (g/cm$^3$) | Internal Bond IB[2] avg. (kg/cm$^2$) |
|---|---|---|---|---|---|---|
| C0 | 4.9 | 2.75 | 23.57 | .683 | .661 | 4.78 |
| C3 | 5.1 | 3.25 | 27.86 | .677 | .663 | 3.94 |
| A | 4.7 | 2.75 | 23.57 | .672 | .664 | 4.29 |
| C1 | 5.0 | 3.5 | 30.0 | .679 | .661 | 5.06 |
| C2 | 5.2 | 3.25 | 27.86 | .669 | .655 | 4.64 |

[1]Press Time per 0.16 cm (1/16th inch) thickness of board
[2]Internal Bond.

TABLE VI

| Sample | Mat Mois (%) | 2 hr. Boil Internal Bond (avg.) DENg /cm$^3$ | 2 hr. Boil Internal Bond (avg.) BIB[1] (kg/cm$^2$) | 2 hr. Boil Internal Bond (avg.) RET[2] (%) | 2 hr. Boil Internal Bond (avg.) BTS[3] (%) | 24-hr. Water Soak (avg.) DEN g/cm$^3$ | 24-hr. Water Soak (avg.) TS[4] (%) | 24-hr. Water Soak (avg.) WA[5] (%) |
|---|---|---|---|---|---|---|---|---|
| C0 | 4.9 | .663 | 2.74 | 57.4 | 29.9 | .717 | 14.3 | 25.9 |
| C3 | 5.1 | .671 | .84 | 21.4 | 39.3 | .699 | 14.1 | 28.1 |
| A | 4.7 | .658 | 2.18 | 50.8 | 31.4 | .699 | 14.0 | 25.5 |
| C1 | 5.0 | .664 | 1.97 | 38.9 | 29.2 | .704 | 12.4 | 23.6 |
| C2 | 5.2 | .671 | 2.6 | 56.1 | 29.9 | .691 | 13.3 | 26.7 |

[1]Boiled Internal Bond test.
[2]Strength Retention. Equal to BIB/IB × 100%
[3]Boiled Thickness Swell
[4]Thickness Swell
[5]Water Absorbed Each of the above resins was used in formulating an adhesive for Southern yellow pine panel particleboard testing in accordance with the procedure outlined below.

Southern yellow pine flakes approximately 7.6 cm (3") in diameter at 5% moisture content (MC) were blended in an 11 kg. blender with about 1 wt % Indra 210 Slack Wax, and about 2 wt % Powder resin, where the application levels are based on oven dried (O.D.) wood. The wood flake-resin blend was pressed at about a 205° C. (400° F.) platen temperature at 15 second intervals having an average closing time of 40 seconds to form particleboard panels having the dimensions of about 40.6 cm×40.6 cm (16"×16")×1.1 cm (7/16"), and a density of about 0.62–0.65 g/cm$^3$ (39–41 lb/ft3).

As can be seen from the above Tables V and VI, an adhesive made using a modified PFLF resin made in accordance with the present invention is substantially equivalent to the control phenol-formaldehyde resin based adhesive in substantially all categories. Additional comparisons were made using the above resins, and are set forth in Comparative Example 3 below.

COMPARATIVE EXAMPLE 3

Each of the above resins A, and C0–C3 were evaluated for cure time and the moisture content was measured using a Karl Fisher technique. The results are shown in Table VII below.

TABLE VII

| Sample | 1400° C. Radial Flow (mm) | 150° C. Stroke Cure (sec.) | Moisture Content (%) |
| --- | --- | --- | --- |
| C0 | 10.0 | 17 | 3.75 |
| C3 | 11.6 | 17 | 3.83 |
| A | 11.5 | 17 | 3.62 |
| C1 | 19.0 | 21 | 4.10 |
| C2 | 15.0 | 21 | 3.60 |

EXAMPLE 4

Preparation of Sample D

An ultrafiltered Kraft lignin-modified phenol-formaldehyde resin was prepared according to the following reaction conditions. The ultrafiltered Kraft lignin solution was formulated by first passing a lignin fraction through an upper molecular weight cut-off ultrafiltration membrane, and passing the material which passed through the membrane through a second lower molecular weight cut-off ultrafiltration membrane. The solution rejected by the second lower molecular weight cut-off ultrafiltration membrane represented the ultrafiltered Kraft lignin, and typically has been characterized in that more than 60 wt % of the molecules have a molecular weight which does not exceed the molecular weight of Glucagon, and more than 65 wt % have a molecular weight which does not exceed 5,000, as determined by gel chromatography.

Approximately 100 parts by weight (pbw) of phenol and 12.8 pbw of a 50% solution of formaldehyde were charged to a reactor (F/P was about 0.2). The temperature of the reaction reached approximately 55° C. before controlled lignin addition. At this time about 57.2 pbw of a concentrated 43 wt % ultrafiltered Kraft lignin solution were added over a 30 minute period, while the temperature reached 100° C. The reaction mixture was held at this temperature for about 1 hour.

At this point, about 106 pbw of water was added, and the temperature decreased to about 56° C. within 3 minutes. Pearl Starch (3.8 pbw), and defoamer (Colloid 999 #1) (0.07 pbw) were added, and the temperature was maintained at 56° C. About 38 pbw of a 50 wt % formaldehyde solution then were added over a two minute interval, and the temperature increased to 59° C. At this point about 11.1 pbw of a 50% sodium hydroxide solution were added, and the temperature of the reaction mixture increased to about 70° C. in about 4 minutes. Additional 50 wt % formaldehyde solution (92.8 pbw) was added over a 45 minute interval, and the temperature of the reaction mixture increased to about 96° C. The reaction mixture was cooled to about 85° C., and about 18.9 pbw of 50% sodium hydroxide were added, and the temperature was maintained at 85° C. for an additional 45 minutes. At this point, about 20.3 pbw of additional 50% sodium hydroxide were added over a 45 minute interval, while the temperature was held at about 85° C. Finally, about 0.06 pbw of defoamer (Colloid 999 #1) were added, and the reaction mixture cooled to room temperature. The resulting resin was labelled Sample D. Sample D had a cumulative F/P mole ratio of 2.25:1, had an alkalinity of about 6.5%, and had a Brookfield viscosity of about 1100 cps. Sample D further comprised about 43% non-volatiles, had a 100° C. gel time of about 24.9 minutes, and had negligible free formaldehyde.

COMPARATIVE EXAMPLE 4

Adhesive glue mixes prepared using Sample D were compared to adhesive glues made using a commercially available standard phenol-formaldehyde resin GP 5779 ® RESI-BOND ® Wood Product Resin (Control 1). Sample D required about 14.2% less phenol, and 7.10% less 50% formaldehyde than the control resin for its preparation. Thus, the lignin addition represented a 12.13% reduction in formulated PF solids.

Adhesive mixes were made using both the Control and Sample D resins according to the following method. The use of "Resin" includes Control 1 and Sample D resins.

Approximately 31.9 parts by weight (pbw) water, 12.7 pbw Spray-X extender, and 4.2 pbw CO-COB filler were charged to an efficient plywood glue mixer while maintaining glue mix homogeneity. The components were mixed for about 4 minutes, and about 47.6 pbw Resin was added, and the components again mixed for about 1 minute. About 8.5 pbw CO-COB filler, and about 0.42 pbw Soda Ash were added, and the components mixed for about 5 additional minutes. Then, about 6.3 pbw 50% sodium hydroxide solution were added, and the mixture mixed for about 7 minutes. Finally, about 100 pbw Resin were added, and the resulting mixture was mixed for about 2 minutes to obtain Control 1 adhesive, and Sample D adhesive.

Each of the above formulated adhesives were used in laboratory panel bonding studies. The panel stock was 0.32 cm (⅛") thick southern pine at either 8–10% moisture content (MC) or 6–8% MC. The boards were constructed using 3 panels, were about 30.5 cm×30.5 cm (12"×12") in area, and about 0.95 cm (⅜") thick. The glue was spread at about 0.034–0.037 g/cm² (32–34 g/ft²) of double glue line, and some of the boards (Press Time series) were pre-pressed for about 4 minutes at 10.54 kg/cm² (150 psi), and had an average open assembly time (OAT) of about 15 minutes. Other boards (OAT series) were glued in the same manner, but had a variable OAT, and were not pre-pressed. The Press Time series boards were hot pressed at a variable rate at 157° C. (315° F.), and 12.3 kg/cm² (175 psi), while the OAT series boards were hot pressed for 3 minutes at 157° C. (315° F.), and 12.3 kg/cm² (175 psi). Each of the series of boards then were hot stacked overnight. The following day, the boards were subjected to panel bonding testing, and the results are shown in Tables VIII, IX, and X below. For each of the tabulated values, 8 panels were tested, and the average value for the 8 panels was calculated.

TABLE VIII

| RESIN | Percent Wood Failure at: (min)* | | | |
| --- | --- | --- | --- | --- |
| | 3½ | 3 | 2¾ | 2½ |
| Control 1 | 79.5 | 41.0 | 23.4 | 1.4 |
| Sample D | 74.1 | 78.8 | 56.5 | 7.1 |

*Above results for Press Time series boards - all 8–10% MC.

TABLE IX

| RESIN | Percent Wood Failure at: (min)* | | | |
| --- | --- | --- | --- | --- |
| | 3½ | 3 | 2¾ | 2½ |
| Control 1 | 84.1 | 88.0 | 77.8 | 42.3 |
| Sample D | 78.3 | 90.8 | 80.6 | 61.5 |

*Above results for Press Time series boards - Backs and Faces 8–10% MC, center 6–8% MC.

TABLE X

| RESIN | Percent Wood Failure at: (min)* | | |
|---|---|---|---|
| | 40 | 60 | 80 |
| Control 1 | 89.3 | 90.1 | 83.6 |
| Sample D | 90.6 | 84.6 | 85.4 |

*Above results for OAT series boards.

From the above tables, it can be seen that at the longest open assembly times, there were no discernable differences between the control and inventive resins. At the shortest press times for the Press Time series, the inventive samples were slightly faster bonding in comparison to the control resin.

Although preferred embodiments of the invention have been disclosed herein, those skilled in the art will appreciate that changes and modifications may be made without departing from the spirit of this invention, as defined in and limited only by the scope of the appended claims.

I claim:

1. A lignin-modified resole resin prepared by:
   (a) reacting formaldehyde and a phenol at a mole ratio of formaldehyde to phenol of less than about 1.0 at a low level of alkalinity to form a precursor resin;
   (b) reacting precursor resin with lignin to form a lignin-modified phenolformaldehyde precursor resin; and
   (c) then reacting the lignin-modified phenol-formaldehyde precursor resin with additional formaldehyde sufficient to provide a cumulative formaldehyde to phenol mole ratio of between about 2.0 and about 4.0.

2. The modified resole resin of claim 1 wherein said low level of alkalinity is established by adding an alkaline material selected from the group consisting of alkali metal hydroxides, alkaline earth metal hydroxides, alkali metal carbonates, and alkali lignin to said formaldehyde and phenol.

3. The modified resole resin of claim 2 wherein said alkaline material is selected from sodium hydroxide and potassium hydroxide.

4. The modified resole resin of claim 2 wherein said alkaline material is present in an amount sufficient to provide a mole ratio of said alkaline material to phenol in a range between about 0.04 and 0.08.

5. The modified resole resin of claim 3 wherein said alkaline material is present in an amount sufficient to provide a mole ratio of said alkaline material to phenol in a range between about 0.04 and 0.08.

6. The modified resole resin of claim 4, wherein the cumulative formaldehyde to phenol mole ratio is within the range of about 2.0 to about 3.0.

7. The modified resole resin of claim 6, wherein the cumulative formaldehyde to phenol mole ratio is within the range of about 2.4 to about 2.5.

8. The modified resole resin of claim 1, wherein the precursor resin has a formaldehyde to phenol mole ratio within the range of about 0.1 to about 0.5.

9. The modified resole resin of claim 4, wherein the precursor resin is formed at a formaldehyde to phenol mole ratio within the range of about 0.2 to about 0.4.

10. The modified resole resin of claim 1, wherein the precursor resin is formed at a formaldehyde to phenol mole ratio of about 0.3.

11. The modified resole resin of claim 1, wherein the lignin is added to the precursor resin over a period of time within the range of from about 30 minutes to about 60 minutes.

12. The modified resole resin of claim 1, wherein the lignin is added to the precursor resin over a period of time within the range of from about 30 minutes to about 45 minutes.

13. An adhesive composition comprising the modified resole resin of claim 1 and a filler.

14. The modified resole resin of claim 1, wherein the lignin is selected from the group consisting of Kraft lignin, ultrafiltered Kraft lignin, and lignosulfonate.

15. The modified resole resin of claim 14, wherein the lignin is a lignosulfonate.

16. An adhesive composition comprising the modified resole resin of claim 4 and a filler.

17. An adhesive composition comprising the modified resole resin of claim 6 and a filler.

18. An adhesive composition comprising the modified resole resin of claim 9 and a filler.

19. The adhesive composition of claim 16, wherein the lignin is selected from the group consisting of Kraft lignin, ultrafiltered Kraft lignin, and lignosulfonate.

20. The adhesive composition of claim 19, wherein the lignin is a lignosulfonate.

21. A method of making a lignin-modified resole resin comprising:
   (a) reacting formaldehyde and a phenol at a mole ratio of formaldehyde to phenol of less than about 1.0 in the presence of an alkaline material in an amount sufficient to provide an alkaline material to phenol mole ratio of between about 0.04 and 0.08 to form a precursor resin;
   (b) reacting precursor resin with lignin to form a lignin-modified phenolformaldehyde precursor resin; and
   (c) then reacting the lignin-modified phenol-formaldehyde precursor resin with additional formaldehyde sufficient to provide a cumulative formaldehyde to phenol mole ratio of between about 2.0 and about 4.0.

22. The method of claim 21, wherein the cumulative formaldehyde to phenol mole ratio is within the range of about 2.0 to about 3.0.

23. The method of claim 21, wherein the cumulative formaldehyde to phenol mole ratio is within the range of about 2.3 to about 2.6.

24. The method of claim 21, wherein the precursor resin is formed at a formaldehyde to phenol mole ratio within the range of about 0.1 to about 0.5.

25. The method of claim 21, wherein the precursor resin is formed at a formaldehyde to phenol mole ratio within the range of about 0.2 to about 0.4.

26. The method of claim 21, wherein the precursor resin is formed at a formaldehyde to phenol mole ratio of about 0.3.

27. The method of claim 21, wherein the lignin is added to the precursor resin over a period of time within the range of from about 30 minutes to about 60 minutes.

28. The method of claim 21, wherein the lignin is added to the precursor resin over a period of time within the range of from about 30 minutes to about 45 minutes.

29. The method of claim 21, wherein the lignin is selected from the group consisting of Kraft lignin, ultrafiltered Kraft lignin, and lignosulfonate.

30. The method of claim 29, wherein the lignin is a lignosulfonate.

31. The method of claim 21, wherein said alkaline material is selected from the group consisting of alkali metal hydroxides, alkaline earth metal hydroxides, alkali metal carbonates, and alkali lignin.

32. A lignin-modified phenol-formaldehyde precursor resin prepared by:
   (a) reacting formaldehyde and a phenol at a mole ratio of formaldehyde to phenol of less than about 1.0 at a low level of alkalinity to form a precursor resin; and
   (b) reacting precursor resin with lignin to form a lignin-modified phenolformaldehyde precursor resin.

33. The modified resin of claim 32, wherein said low level of alkalinity is established by adding an alkaline material selected from the group consisting of alkali metal hydroxides, alkaline earth metal hydroxides, alkali metal carbonates, and alkali lignin to said formaldehyde and phenol.

34. The modified resole resin of claim 33, wherein said alkaline material is selected from sodium hydroxide and potassium hydroxide.

35. The modified resole resin of claim 34, wherein said alkaline material is present in an amount sufficient to provide a mole ratio of said alkaline material to phenol in a range between about 0.04 and 0.08.

36. The modified resole resin of claim 34, wherein the precursor resin has a formaldehyde to phenol mole ratio within the range of about 0.1 to about 0.5.

37. The modified resole resin of claim 35, wherein the precursor resin is formed at a formaldehyde to phenol mole ratio within the range of about 0.2 to about 0.4.

38. The modified resole resin of claim 32, wherein the precursor resin is formed at a formaldehyde to phenol mole ratio of about 0.3.

39. The method of making a lignin-modified phenol-formaldehyde precursor resin comprising:
   (a) reacting formaldehyde and a phenol at a mole ratio of formaldehyde to phenol of less than about 1.0 in the presence of an alkaline material in an amount sufficient to provide an alkaline material to phenol mole ratio between about 0.04 and 0.08 to form a precursor resin; and
   (b) reacting precursor resin with lignin to form a lignin-modified phenol-formaldehyde precursor resin.

40. The method of claim 39, wherein the precursor resin is formed at a formaldehyde to phenol mole ratio within the range of about 0.1 to about 0.5.

41. The method of claim 40, wherein the precursor resin is formed at a formaldehyde to phenol mole ratio within the range of about 0.2 to about 0.4.

42. The method of claim 41, wherein the precursor resin is formed at a formaldehyde to phenol mole ratio of about 0.3.

43. The method of claim 39, wherein the lignin is selected from the group consisting of Kraft lignin, ultrafiltered Kraft lignin, and lignosulfonate.

44. The method of claim 40, wherein the lignin is a lignosulfonate.

45. The method of claim 43, wherein said alkaline material is selected from the group consisting of alkali metal hydroxides, alkaline earth metal hydroxides, alkali metal carbonates, and alkali lignin.

* * * * *